United States Patent
Wang et al.

(10) Patent No.: US 8,853,320 B2
(45) Date of Patent: Oct. 7, 2014

(54) HYBRID POLYESTER FLUOROCARBON POWDER COATING COMPOSITION AND PROCESS FOR MANUFACTURE THEREOF

(75) Inventors: Lijum Wang, Tianjin (CN); Wei Jiang, Zhejiang (CN); Graeme Alan Bell, Washington (GB); Nirmalya Chakravorty, Kamanahalli (IN)

(73) Assignee: Akzo Nobel Powder Coatings (Ningbo) Co., Ltd., Zhejiang (CN)

( * ) Notice: Subject to any disclaimer, the term of this patent is extended or adjusted under 35 U.S.C. 154(b) by 0 days.

(21) Appl. No.: 13/878,052

(22) PCT Filed: Oct. 13, 2011

(86) PCT No.: PCT/CN2011/080733
§ 371 (c)(1),
(2), (4) Date: Apr. 5, 2013

(87) PCT Pub. No.: WO2012/048650
PCT Pub. Date: Apr. 19, 2012

(65) Prior Publication Data
US 2013/0196062 A1     Aug. 1, 2013

(30) Foreign Application Priority Data

Oct. 13, 2010   (WO) ................ PCT/CN2010/077704
Feb. 18, 2011   (EP) ..................................... 11154925

(51) Int. Cl.
| | |
|---|---|
| C08G 69/26 | (2006.01) |
| C09D 127/12 | (2006.01) |
| C08G 18/08 | (2006.01) |
| C08G 18/80 | (2006.01) |
| C09D 167/00 | (2006.01) |
| C08G 18/62 | (2006.01) |
| C09D 5/03 | (2006.01) |
| C08L 51/00 | (2006.01) |

(52) U.S. Cl.
CPC ............ *C09D 167/00* (2013.01); *C09D 127/12* (2013.01); *C08G 18/0895* (2013.01); *G08G 18/798* (2013.01); *C08G 2150/20* (2013.01); *C08G 18/8074* (2013.01); *C08G 18/6279* (2013.01); *C09D 5/03* (2013.01)
USPC ............................ 524/538; 427/201; 525/169

(58) Field of Classification Search
USPC .......................................... 524/538; 427/201
See application file for complete search history.

(56) References Cited

U.S. PATENT DOCUMENTS

| | | | |
|---|---|---|---|
| 4,916,188 A | 4/1990 | Reising | |
| 5,321,063 A * | 6/1994 | Shimada et al. | ................. 524/37 |
| 5,356,971 A | 10/1994 | Sagawa et al. | |
| 6,376,589 B1 | 4/2002 | Tanaka et al. | |
| 6,864,316 B1 | 3/2005 | Iwakiri et al. | |
| 2004/0096669 A1 | 5/2004 | Kim | |

FOREIGN PATENT DOCUMENTS

| | | |
|---|---|---|
| EP | 0 371 599 | 6/1990 |
| EP | 1 233 044 | 8/2002 |
| EP | 1 422 269 | 5/2004 |
| GB | 2 325 235 | 11/1998 |
| JP | 58-213062 | 12/1983 |
| JP | 60-201945 | 10/1985 |
| JP | 1-190744 | 7/1989 |
| JP | 06004785 | 1/1994 |
| JP | 11-116854 | 4/1999 |
| JP | 2000-07988 | 1/2000 |
| WO | 99/60066 | 11/1999 |

OTHER PUBLICATIONS

International Search Report and Written Opinion of the International Searching Authority for International Application No. PCT/CN2010/077704, mailed on Jul. 21, 2011.
European Search Report for European Application No. 11154925.9-1214, mailed on Aug. 19, 2011.

* cited by examiner

*Primary Examiner* — Terressa Boykin
(74) *Attorney, Agent, or Firm* — Kenyon & Kenyon LLP

(57) ABSTRACT

The invention relates to hybrid polyester-fluorocarbon powder coating composition and the manufacture thereof. These powder coating compositions are manufactured in a process comprising the steps of:
  Preparation of a polyester powder coating composition A, comprising a polyester resin and a curing agent for said polyester resin;
  Preparation of a fluorocarbon powder coating composition B, comprising a fluorocarbon resin and a curing agent for said fluorocarbon resin; and
  Dry blending said polyester powder coating composition A and fluorocarbon powder coating composition B,
wherein the weight ratio of polyester powder coating composition A to fluorocarbon powder coating composition B is in the range of 70:30 to 30:70.

14 Claims, No Drawings

HYBRID POLYESTER FLUOROCARBON POWDER COATING COMPOSITION AND PROCESS FOR MANUFACTURE THEREOF

REFERENCE TO RELATED APPLICATIONS

This application is the U.S. National Phase of PCT/CN2011/080733 filed on Oct. 13, 2011, and claims the benefit of International Application No. PCT/CN2010/077704, filed on Oct. 13, 2010, and European Application No. EP 11154925.9, filed Feb. 18, 2011.

Powder coating compositions are solid compositions that generally comprise a solid film-forming resin or mixtures of different kind of resins, usually with one or more pigments and, optionally, one or more performance additives such as plasticizers, stabilizers, flow aids and extenders. The resins are usually thermosetting, incorporating, for example, a binder resin and a corresponding crosslinking agent (which may itself be another binder resin). Generally, the resins have a $T_g$, softening point or melting point above 30° C.

Conventionally, the manufacture of a powder coating comprises melt-mixing the components of the composition. Melt-mixing involves the high speed, high intensity mixing of dry ingredients and then the heating of the mixture to an elevated temperature—above the softening temperature of the resin but below the curing temperature—in a continuous compounder to form a molten mixture. The compounder preferably comprises a single or twin screw extruder as these serve to improve the dispersion of the other ingredients in the resin as the resin melts. The molten mixture is extruded, typically rolled in the form of a sheet, cooled to solidify the mixture and subsequently crushed to flakes and subsequently pulverised to a fine powder Such processing is then generally followed by a sequence of particle sizing and separation operations—such as grinding, classifying, sifting, screening, cyclone separation, sieving and filtering—that precede the application of the powder to a substrate and the heating of that powder to melt and fuse the particles and to cure the coating. The main methods by which powder coatings are applied include fluidized-bed, wherein a substrate is preheated and dipped in a fluidised bed of the powder resulting in the powder fusing on contact with hot surface and adhereing to the substrate, and electrostatic fluidized-bed processes and electrostatic spray processes in which the powder coating particles are electrostatically charged by electrodes within a fluid bed or by an electrostatic spray gun and directed to be deposited onto an earthed substrate.

Powder coating compositions comprising a fluorocarbon resin are known in the art. In U.S. Pat. No. 4,916,188 a hybrid fluorocarbon powder coating is disclosed comprising a hydroxyl functional fluorocarbon resin, a blocked diisocyanate crosslinker, and a hydroxyl functional acrylic or polyester polymer. The examples show that the hybrid system has inferior gloss retention in comparison to a fluorocarbon powder coating that does not contain a hydroxyl functional acrylic or polyester resin. The powder coating compositions are prepared by dry blending the individual components followed by melt-mixing of this dry-blend in a high intensity mixer, followed by extruding the molten mixture from a heated extruder. A similar process is also known from U.S. Pat. No. 6,864,316.

However, there is a need for hybrid polyester fluorocarbon powder coating systems that show a gloss retention that is at least similar to the gloss retention of a powder coating composition that only contains a fluorocarbon resin since these hybrid systems are found to improve the mechanical properties of the coating significantly in comparison with 100% fluorocarbon systems.

Surprisingly, it was found that a hybrid polyester fluorocarbon powder coating system with good gloss retention properties (i.e. gloss retention properties comparable to or exceeding that of a 100% fluorocarbon system) can be obtained by manufacturing the hybrid polyester fluorocarbon powder coating composition in a process comprising the steps of:
 Preparation of a polyester powder coating composition A, comprising a polyester resin and a curing agent for said polyester resin in a melt-mixing process;
 Preparation of a fluorocarbon powder coating composition B, comprising a fluorocarbon resin and a curing agent for said fluorocarbon resin in a melt-mixing process; and
 Dry blending said polyester powder coating composition A and fluorocarbon powder coating composition B.

In a further embodiment, the invention also relates to a hybrid polyester-fluorocarbon powder coating composition, comprising:
 30-70 wt. % based on the total weight of the powder coating composition of discrete particles comprising a polyester resin and a curing agent for said polyester resin; and
 70-30 wt. % based on the total weight of the powder coating composition of discrete particles comprising a fluorocarbon resin and a curing agent for said fluorocarbon resin Polyester resins that can be used in accordance with this invention as an ingredient of powder coating composition A include hydroxyl functional polyesters characterized by having: i) a hydroxyl number in the range from about 25 to about 50; ii) an acid number less than or equal to 15 but preferably in the range from about 1 to 2; and, iii) a $T_g$ higher than 50° C.

Hydroxy functional polyesters meeting these requirements are commercially available as RUCOTE® 107, CARGILL® 3000/3016, Uralac P1550 and CRYLCOAT® 3109. Equally, however such polyesters may be formed as the condensation products of polybasic carboxylic acids and polyhydric alcohols. As such, carboxylic acids useful for the preparation of such polyester resins include one or more of phthalic acid, tetra- and hexahydrophthalic acids and their anhydrides, succinic acid, adipic acid, sebacic acid, terephthalic and isophthalic acids, 1,3- and 1,4-cyclohexane-dicarboxylic acids, and trimellitic anhydride, esters of such acids. Further, suitable difunctional alcohols include ethylene-, diethylene-, propylene-, isomers of 1,2 and 1,3 propylene glycol and trimethylene glycol and suitable dihydric alcohols include hexanediol, 1,3-, 1,2-, and 1,4-butanediols, neopentyl glycol, 2-butyl-2-ethyl-1,3-propanediol, 2-methyl-1,3-propanediol, 1,4-cyclohexanediol, trimethylolpropane, and mixtures thereof. The skilled reader will be aware of a number of such acids and alcohols and processes for carrying out the condensation of the acids and alcohols.

Curing agents for the polyester resin that can be used in accordance with this invention as an ingredient of powder coating composition A include isocyanate crosslinking components, preferably blocked diisocyanates which become unblocked and activated under heat and at temperatures approximately above the melt temperature of the powder coating. Latent blocked isocyanate crosslinking agents useful according to this invention are derived from a wide variety of isocyanates and/or mixtures thereof. These include, for example, isophorone diisocyanate; 2,4-tolylene diisocyanate; 2,6-tolylene diisocyanate; alkylene diisocyanates such as 1,4-tetramethylene-diisocyanate; 1,6-hexamethylene diisocyanate; 1,12-dodecane diisocyanate; cyclobutane and cyclohexane (1,3 and 1,4-) diisocyanates; phenylene diisocyanates (1,3- and 1,4-) and naphthalene-1,5-diisocyanate. Suitable blocking agents are those known in the art and include alcohols, phenol, ketoximes and the like. Especially preferred are 2-ethylhexyl alcohol and caprolactam. Preferred isocyanates include isophorone diisocyanate adduct with polyol such as trimethylolpropane and blocked with caprolactam and a urethdione linked isophorone diisocyanate.

In one embodiment, the curing agent for the polyester resin is an internally or self-blocked isocyanate resulting from the dimerisation of isocyanate groups, resulting in an uretdione structure.

In a further embodiment, the curing agent for the polyester resin is a cycloaliphatic isocyanate resin.

On a weight basis, the polyester powder coating composition A comprises between about 15 and 30 weight parts of an isocyanate crosslinker per 100 weight parts of reactive polyester polymer.

Fluorocarbon resins that can be used in accordance with this invention as an ingredient of powder coating composition B include reactive thermosetting polymeric fluorocarbon polymer resins adapted to be crosslinked with blocked isocyanate compound.

Such fluorocarbon polymer resins typically comprise copolymerized ethylenically unsaturated monomers containing carbon-to-carbon double bond unsaturation including minor amounts of hydroxylated vinyl monomers and major amounts of fluorocarbon monomers. Examples of commercial available suitable fluorocarbon polymer resins include Lumiflon LF710.

The preferred reactive thermosetting fluorocarbon polymer comprises a copolymer of a hydroxyalkyl vinyl ether and a fluorolefin such as tetra or trifluoroethylene. The most preferred reactive fluorocarbon polymers comprise a terpolymer of alkyl vinyl ether, hydroxalkyl vinyl ether, and a fluoroalkylene such as tetra- or trifluoroethylene. Copolymer chains are believed to be a blocked copolymer of alternating units of trifluoroethylene and vinyl ether with pendant side chain structures containing hydroxyl functionality due to the hydroxyalkyl vinyl ethers. Preferred fluorocarbon copolymers or terpolymers comprise by mole percent between 30% and 70% fluorolefin and between 30% and 70% vinyl ether units including hydroxyalkyl vinyl ether units. Preferred fluorolefins include tetrafluoroethylene, trifluoroethylene and chlorotrifluoroethylene. Preferred alkyl vinyl ethers include linear or branched chain aliphatic alkyls having from 2 to 8 carbon atoms such as methyl vinyl ether, ethyl vinyl ether, isopropyl vinyl ether, n-butyl vinyl ether, and similar lower alkyl vinyl ethers. Hydroxy alkyl-vinyl ethers are similar alkyl vinyl ethers containing a substituted hydroxyl group on the alkyl chain. Hydroxy vinyl ether units comprise between 1% and 30% by mole percent of the hydroxyl functional fluorocarbon polymer. The hydroxy value of the hydroxyl functional fluorocarbon polymer is between 2 and 200 and preferably between 5 and 150. Highly desirable hydroxyl fluorocarbons are terpolymers of alkyl vinyl ether, hydroxyalkyl ether, and trifluoroethylene copolymer sold commercially and known as Lumiflon Polymers. The preferred hydroxyl functional fluorocarbon polymers contain copolymerized monomeric units comprising by molar percent between 30% and 70% and preferably between 45% and 48% fluorocarbon monomer, between 1% and 30% and preferably between 2% and 5% hydroxy alkyl vinyl ether monomer, with the balance being alkyl vinyl ether monomer. The functional fluorocarbon polymer is a solid at ambient temperatures and have a softening point or Tg above about 35° C. and preferably between 35° C. and 50° C. with a number average molecular weight between 8,000 and 16,000 and preferably between 10,000 and 14,000, as measured by GPC (gel permeation chromatography) ASTM D 3016-78, D 3536-76, and D 3593-80.

Curing agents for the reactive fluorocarbon resin that can be used in accordance with this invention as an ingredient of powder coating composition B include isocyanate crosslinking components, preferably blocked diisocyanates which become unblocked and activated under heat and at temperatures approximately above the melt temperature of the powder coating. Latent blocked isocyanate crosslinking agents useful according to this invention are derived from a wide variety of isocyanates and/or mixtures thereof. These include, for example, isophorone diisocyanate; 2,4-tolylene diisocyanate; 2,6-tolylene diisocyanate; alkylene diisocyanates such as 1,4-tetramethylene-diisocyanate; 1,6-hexamethylene diisocyanate; 1,12-dodecane diisocyanate; cyclobutane and cyclohexane (1,3 and 1,4-) diisocyanates; phenylene diisocyanates (1,3- and 1,4-) and naphthalene-1,5-diisocyanate. Suitable blocking agents are those known in the art and include alcohols, phenol, ketoximes and the like. Especially preferred are 2-ethylhexyl alcohol and caprolactam. Preferred isocyanates include isophorone diisocyanate adduct with polyol such as trimethylolpropane and blocked with caprolactam and a urethdione linked isophorone diisocyanate. Non-blocked isocyanate being free from blocking agent and containing a urethdione linkage can be used in combination with a blocked isocyanate.

In one embodiment the curing agent for the fluorocarbon resin is a blocked cycloaliphatic isocyanate resin.

On a weight basis, the fluorocarbon powder coating composition B comprises between about 15 and 30 weight parts of isocyanate crosslinker per 100 weight parts of reactive fluorocarbon polymer.

Polyester powder coating composition A, comprising a polyester resin and a curing agent for said polyester resin can be made in a melt-mixing process known to those skilled in the art.

Fluorocarbon powder coating composition B, comprising a flurocarbon resin and a curing agent for said fluorocarbon resin can be made in a melt-mixing process known to those skilled in the art.

The dry blending of Polyester powder coating composition A and Fluorocarbon powder coating composition B can be done in any suitable apparatus known to those skilled in the art, for example by using a ball mill or a high speed agitator.

Polyester powder coating composition A and Fluorocarbon powder coating composition B can contain further additives for powder coatings known to those skilled in the art.

In addition to the resin systems and the polyester and fluorocarbon powder coating compositions may comprise other components that are conventionally known in the art. These may include: fillers, flow control agents, degassing agents, and antiblocking agents.

Further suitable additives may include: adhesion promoters; light stabilizers and UV absorbers; flow and leveling additives; gloss-modifying additives; cratering agents; cure agents; texturizers; surfactants; wetting agents; antioxidants (in particular phosphites, hindered phenols and propionates); biocides; and, organic plasticizers.

Fillers may be employed to reduce cost and/or reinforce or modify the performance and appearance of the coatings. Fillers comprising glass particles, glass fibres, metal fibers, metal flakes and particles of micas or calcium metasilicate can be included in the powder coating compositions of this invention. Inorganic sulphates such as barites, carbonates such as chalk, and silicates such as talc are commonly used.

Metallics including zinc rich anticorrosive particulates may be added to powder coating compositions to impart corrosion resistance to the underlying substrate.

Flow control agents may be present in the powder coating compositions in an amount up to 3 wt. % based on the weight of the composition. Such flow control agents, which enhance the compositions melt-flow properties and assist in eliminating surface defects, typically include acrylics and fluorine based polymers. Examples of commercially available flow control agents include: Resiflow® P-67, Resiflow® P-200 and Clearflow® (all available from Estron Chemical Inc., Calvert City, Ky.); BYK® 361 and BYK® 300 from BYK Chemie (Wallingford, Conn.); Mondaflow® 2000 from Monsanto (St. Louis, Mo.); and, Acranal 4F from BASF.

Degassing agents can also be used in the powder coating compositions of the present invention in an amount between 0.1 and 5 wt. %, based on the weight of the composition. Such degassing agents facilitate the release of gases during the curing process. Examples of commercially available degassing agents include: Benzoin available from Well Worth Medicines; and, Uraflow® B available from GCA Chemical Corporation (Brandenton, Fla.).

The powder coating compositions may also comprise an antiblocking agent (dry-flow additive) in an amount from 0.05 to 1.0 wt. %, based on the total weight of the composition. Examples of such additives include fumed silica, precipitated silica, fumed alumina, clay, talc and mixtures thereof.

The polyester powder coating composition A, comprising a polyester resin and a curing agent for said polyester resin resulting from the melt-mixing process will consist of discrete particles comprising a polyester resin and a curing agent for said polyester resin, and any further ingredients that were added to this powder coating composition.

The fluorocarbon powder coating composition B, comprising a fluorocarbon resin and a curing agent for said fluorocarbon resin resulting from the melt-mixing process will consist of discrete particles comprising a fluorocarbon resin and a curing agent for said fluorocarbon resin, and any further ingredients that were added to this powder coating composition.

The hybrid powder coating according to the present invention is obtained by dry mixing polyester powder coating composition A and fluorocarbon powder coating composition B. This mixture will contain discrete particles of polyester powder coating composition A and discrete particles of fluorocarbon powder coating composition B.

In one embodiment, the polyester powder coating composition A is mixed with the fluorocarbon powder coating composition B in a weight ratio of 70:30-30:70. In such process a hybrid polyester-fluorocarbon powder coating composition is obtained, comprising:
- 30-70 wt. % based on the total weight of the powder coating composition of discrete particles comprising a polyester resin and a curing agent for said polyester resin; and
- 70-30 wt. % based on the total weight of the powder coating composition of discrete particles comprising a fluorocarbon resin and a curing agent for said fluorocarbon resin.

The hybrid polyester-fluorocarbon powder coating composition obtained using the process of the present invention can be used for the manufacture of weather-resistant panels that have a good UV-resistance and excellent gloss retention, even after prolonged exposure to Florida weather conditions.

These powder coating compositions can be used for various architectural applications under severe or hostile conditions.

The invention will be elucidated with reference to the following examples. These are intended to illustrate the invention but are not to be construed as limiting in any manner the scope thereof.

The $T_g$ of a material can be measured using differential scanning calorimetry (DSC). In this measurement the energy released when heating a sample is measured. The results of this measurement can be used to determine the $T_g$. This procedure is well known to the skilled person. The $T_g$ values mentioned in this document were measured using a heating rate of 20 K/min. Before each measurement, a sample is heated for a short period of time to a temperature just above the (expected) $T_g$ The acid value of a polymer corresponds to the the amount of free acid present in the polymer as measured by the milligrams of potassium hydroxide (per gram of polymer) needed to neutralize these free acid groups.

EXAMPLES

Test Methods

The gloss of cured coatings was measured in accordance with ISO2813

Example 1

A powder coating composition FP1 was prepared in a heated extruder using a melt-kneading process using the following components:

| | |
|---|---|
| 50.5 | pbw of Lumiflon 710 |
| 16.8 | pbw of cycloaliphatic diisocyanate adduct with caprolactam blocking groups |
| 1.0 | pbw of a dispersing agent |
| 0.3 | pbw of benzoin |
| 31.4 | pbw of a various pigments and fillers |

Example 2

A powder coating composition PET1 was prepared in a heated extruder using a melt-kneading process using the following components:

| | |
|---|---|
| 53.9 | pbw of a Uralac P1550 |
| 13.5 | pbw of a non-blocked cycloaliphatic polyuretdione |
| 1.0 | pbw of a dispersing agent |
| 0.3 | pbw of benzoin |
| 31.3 | pbw of a various pigments and fillers |

Example 3

A powder coating composition MIX1 was prepared in a heated extruder using a melt-kneading process using the following components:

| | |
|---|---|
| 50.5 | pbw of Lumiflon 710 |
| 16.8 | pbw of cycloaliphatic diisocyanate adduct with caprolactam blocking groups |
| 53.9 | pbw of a Uralac P1550 |

-continued

| | |
|---|---|
| 13.5 | pbw of non-blocked cycloaliphatic polyuretdione |
| 2.0 | pbw of a dispersing agent |
| 0.6 | pbw of benzoin |
| 62.7 | pbw of a various pigments and fillers |

Example 4

Powder coating composition FP1 and PET1 were dry blended in a mixing set-up for powder coating materials. The obtained powder coating was coded MIX2. MIX2 is a 50/50 hybrid polyester/fluorocarbon powder coating composition in accordance with the present invention.

Example 5

Powder coating compositions FP1, MIX1, and MIX2 were each sprayed on a metal substrate and heated and cured to give a smooth powder coating on one side of the substrate.

Directly after manufacture, the gloss of the powder coated substrates was measured. After this initial measurement the coated substrates were exposed to intense light from a Xenon lamp. The gloss was measured at certain intervals after the start of the exposure to the Xenon lamp. The results are provided in Table 1.

The gloss retention is the measured gloss level relative to the gloss level measured directly after manufacture (=100).

TABLE 1

| | Gloss retention | | | |
|---|---|---|---|---|
| Time (hours) | FP1* | PET1* | MIX1* | MIX2 |
| 0 | 100 | 100 | 100 | 100 |
| 1000 | 100 | 101 | 105 | 107 |
| 2000 | 98 | 102 | 92 | 108 |
| 3000 | 91 | 83 | 82 | 106 |
| 4000 | 86 | 70 | 79 | 100 |
| 6000 | 73 | <<40 | <40 | 94 |

*Comparative example

Example 6

Various types of fluorocarbon powder coating compositions were prepared according to the method of example 1 using the following ingredients (in pbw):

| | FP2 | FP3 | FP4 | FP5 |
|---|---|---|---|---|
| Lumiflon 710 | 62.1 | 54.3 | 51.8 | 44.3 |
| cycloaliphatic diisocyanate adduct with caprolactam blocking groups | 20.7 | 18.1 | 17.3 | 14.8 |
| a dispersing agent | 1.0 | 1.0 | 1.0 | 1.0 |
| benzoin | 0.3 | 0.3 | 0.3 | 0.3 |
| various pigments and fillers | 15.9* | 26.3 | 29.6 | 39.6 |

*Only pigment(s), no filler

Example 7

Various types of polyester powder coating compositions were prepared according to the method of example 2 using the following ingredients (in pbw):

| | PET2 | PET3 | PET4 | PET5 |
|---|---|---|---|---|
| Uralac P1550 | 66.2 | 58.9 | 55.2 | 47.2 |
| non-blocked cycloaliphatic polyuretdione | 16.6 | 14.5 | 13.8 | 11.8 |
| a dispersing agent | 1.0 | 1.0 | 1.0 | 1.0 |
| benzoin | 0.3 | 0.3 | 0.3 | 0.3 |
| various pigments and fillers | 15.9* | 25.3 | 29.7 | 39.7 |

*Only pigment(s), no filler

Example 8

Using the fluorocarbon powder coating compositions prepared in Examples 1 and 6 and the polyester powder coating compositions prepared in Examples 2 and 7, various dry blended hybrid polyester/fluorocarbon powder coating composition in accordance with the present invention were prepared using the method of example 4. The following hybrid dry blended compositions were prepared (in pbw)

| | MIX | | | | | | | |
|---|---|---|---|---|---|---|---|---|
| | 3 | 4 | 5 | 6 | 7 | 8 | 9 | 10 |
| FP1 | 30 | | | | | | | |
| FP2 | | 70 | 50 | 30 | | | | |
| FP3 | | | | | 50 | 30 | | |
| FP4 | | | | | | | 50 | |
| FP5 | | | | | | | | 50 |
| PET1 | 70 | | | | | | | |
| PET2 | | 30 | 50 | 70 | | | | |
| PET3 | | | | | 50 | 70 | | |
| PET4 | | | | | | | 50 | |
| PET5 | | | | | | | | 50 |

Example 9

Powder coating compositions MIX3-MIX12 prepared in Example 8 were each sprayed on a metal substrate and heated and cured to give a smooth powder coating on one side of the substrate.

Directly after manufacture, the gloss of the powder coated substrates was measured. After this initial measurement the coated substrates were exposed to intense light from a Xenon lamp. The gloss was measured at certain intervals after the start of the exposure to the Xenon lamp. The results are provided in Table 2.

The gloss retention is the measured gloss level relative to the gloss level measured directly after manufacture (=100).

TABLE 2

| | Gloss retention-2 | | | | | | | |
|---|---|---|---|---|---|---|---|---|
| Time | MIX | | | | | | | |
| (hours) | 3 | 4 | 5 | 6 | 7 | 8 | 9 | 10 |
| 0 | 100 | 100 | 100 | 100 | 100 | 100 | 100 | 100 |
| 1000 | 126 | 98 | 106 | 104 | 109 | 109 | 115 | 114 |
| 2000 | 124 | 101 | 108 | 115 | 104 | 117 | 113 | 107 |
| 3000 | 114 | 102 | 106 | 100 | 102 | 121 | 100 | 95 |
| 4000 | 103 | 97 | 100 | 104 | 98 | 109 | 95 | 86 |
| 6000 | 96 | 92 | 90 | 90 | 90 | 102 | 83 | 81 |

Further tests were done wherein compositions were prepared with the same curing agent in the fluoropolymer powder coating composition and the polyester powder coating composition. For example, the examples reported above were repeated by having a cycloaliphatic diisocyanate adduct with caprolactam blocking groups as curing agent in both the fluoropolymer powder coating composition and the polyester powder coating composition. In essence, the same results were found as reported above, i.e. a good gloss retention for the dry-blended systems. No significant difference in performance was found between dry-blended compositions comprising 30 wt. % of a fluoropolymer powder coating composition and 70 wt. % of a polyester powder coating composition, comprising 50 wt. % of a fluoropolymer powder coating composition and 50 wt. % of a polyester powder coating composition, or comprising 70 wt. % of a fluoropolymer powder coating composition and 30 wt. % of a polyester powder coating composition.

The invention claimed is:

1. A process for the manufacture of a hybrid polyester-fluorocarbon powder coating composition, comprising the steps of:
    preparing a polyester powder coating composition A, comprising a polyester resin and a curing agent for said polyester resin;
    preparing a fluorocarbon powder coating composition B, comprising a fluorocarbon resin and a curing agent for said fluorocarbon resin; and
    dry blending said polyester powder coating composition A and fluorocarbon powder coating composition B,
wherein the weight ratio of polyester powder coating composition A to fluorocarbon powder coating composition B is in the range of 70:30 to 30:70.

2. The process according to claim 1 wherein the curing agent for the polyester resin is a cycloaliphatic isocyanate resin.

3. The process according to claim 1, wherein the curing agent for the polyester resin is an uretdione isocyanate resin.

4. The process according to claim 1 wherein the curing agent for the fluorocarbon resin is a cycloaliphatic isocyanate resin.

5. The process according to claim 1 wherein the curing agent for the fluorocarbon resin is a caprolactam-blocked isocyanate resin.

6. A hybrid polyester-fluorocarbon powder coating composition, comprising:
    30-70 wt. % based on the total weight of the powder coating composition, of discrete particles comprising a polyester resin and a curing agent for said polyester resin; and
    70-30 wt. % based on the total weight of the powder coating composition, of discrete particles comprising a fluorocarbon resin and a curing agent for said fluorocarbon resin.

7. A method of coating, comprising coating panels for architectural use with the hybrid polyester-fluorocarbon powder coating composition of claim 6.

8. The process according to claim 2, wherein the curing agent for the polyester resin is an uretdione isocyanate resin.

9. The process according to claim 2 wherein the curing agent for the fluorocarbon resin is a cycloaliphatic isocyanate resin.

10. The process according to claim 3 wherein the curing agent for the fluorocarbon resin is a cycloaliphatic isocyanate resin.

11. The process according to claim 8 wherein the curing agent for the fluorocarbon resin is a cycloaliphatic isocyanate resin.

12. The process according to claim 2 wherein the curing agent for the fluorocarbon resin is a caprolactam-blocked isocyanate resin.

13. The process according to claim 3 wherein the curing agent for the fluorocarbon resin is a caprolactam-blocked isocyanate resin.

14. The process according to claim 8 wherein the curing agent for the fluorocarbon resin is a caprolactam-blocked isocyanate resin.

* * * * *